Patented Feb. 9, 1937

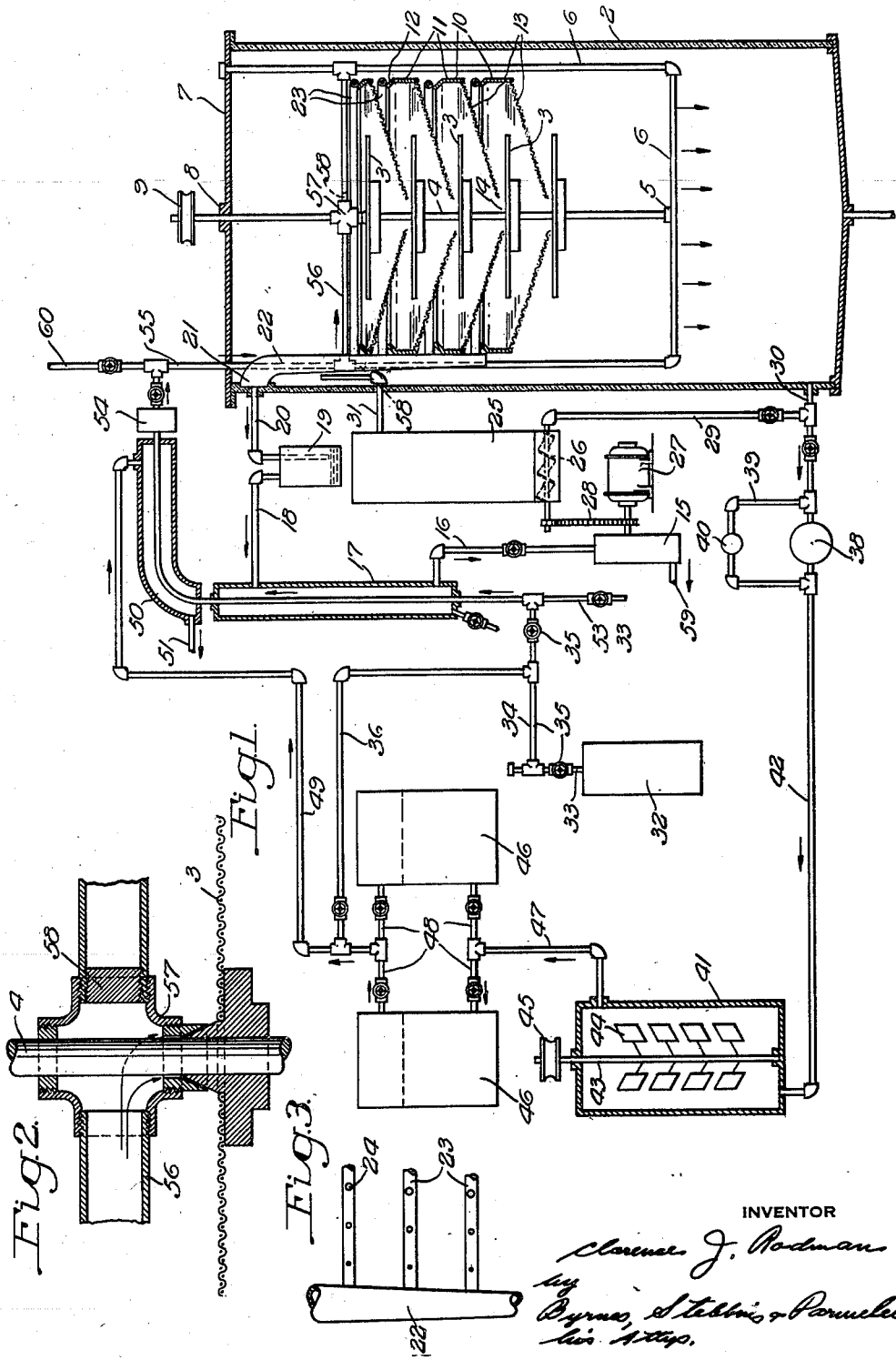

2,070,453

UNITED STATES PATENT OFFICE 2,070,453

PROCESS AND APPARATUS FOR PURIFYING LIQUIDS

Clarence J. Rodman, Alliance, Ohio

Application March 18, 1929, Serial No. 347,973
Renewed December 10, 1931

18 Claims. (Cl. 196—16)

This invention relates to a method and apparatus for purifying liquids and more particularly to a method and apparatus for rendering non-aqueous liquids, such as mineral hydrocarbon oils anhydrous, free from dissolved gases, volatiles and volatile hydrocarbons which result from oxidation of the oil when in use. It also relates to the breaking up of emulsions and to the removal of true water of solution.

Mineral hydrocarbon oils are refined for and find a wide application as an insulating medium in oil submerged electrical apparatus because of the dielectric strength characteristics of the oil. The oils are used both as a cooling and insulating medium in transformers, voltage regulators, and as an insulating medium in cable joints and the like. When hydrocarbon oils are used for these purposes, they are subjected to oxidation reactions resulting from the combined action of heat absorbed from the electrical apparatus, and the oxygen in the atmosphere which has ready access to the oil. Complex hydrocarbons are chemically altered by such oxidation reactions resulting in the formation of organic acids, volatile hydrocarbons, soap and deposits termed sludge. When hydrocarbon mineral oils are used in electrical apparatus such as circuit breakers, the arcing action which takes place results in decomposition of the complex hydrocarbons forming elemental carbon, hydrogen, carbon monoxide, carbon dioxide, methane, and hydrocarbon vapors, all of which reduce the dielectric strength of the insulating medium. Concurrently with the decomposition of a portion of the oil, water may be formed due to the combination of hydrogen evolved in the zone of the arc with oxygen dissolved in the oil. These traces of water may be in true solution in the oil and together with the evolved carbon particles of colloidal size contribute to the deterioration of the insulating value of the oil.

Heretofore it has been attempted to remove water and suspensions by gravity, by centrifugal force, and by filtering. These processes, however, have been only partially successful because they fail to remove water of true solution, volatile hydrocarbons and dissolved gases such as oxygen.

The present application discloses certain improvements in the process and apparatus described in an application filed by me jointly with Max Hecht and Charles L. Jones, Serial No. 299,530, on August 14, 1928, for a Process and apparatus for purifying liquids. In such joint application the liquid to be purified is introduced in a film state into a relatively highly rarified atmosphere and immediately dispersed in a manner so as to prevent the formation of foam or froth, and in such a way that the whole operation is carried out so that the liquid is prevented from contacting with atmospheric moisture and gases until the process is complete. The prior mentioned joint application and the present application, while describing the purification of mineral hydrocarbon oils in detail, are concerned and are applicable to the purification of any non-aqueous liquids; in the purification of mineral hydrocarbon oils, the inventions are applicable both to the preparation of new oils and to the conditioning of oils after use, as for example, in oil submerged electrical apparatus.

One of the objects of the present invention is to provide an improved process and apparatus whereby not only a great degree of purification of liquid to be treated is provided, but also whereby a much greater quantity of the liquid can be purified by an apparatus of a given size in the same amount of time than heretofore.

Another object of my invention is to provide an improved method and apparatus for removing moisture and gases from liquids by centrifuging the liquid to be purified in a thin film in a relatively highly rarified atmosphere in such a manner that both surfaces of the film are exposed to the rarified atmosphere.

Yet another object of my invention resides in the provision of an improved method and apparatus for causing the flow of the liquid to be purified in a highly rarified atmosphere in a thin film and in such a manner that both the surfaces of the film are exposed to the rarified atmosphere during the flow.

Yet another object of my invention resides in the improved details of construction not only of the centrifuging elements for the liquid to be purified, but also for the perforated or reticulated flow elements or collector pans whereby the liquid in flowing in a film in the rarified atmosphere has both sides thereof exposed to the vacuum.

Yet another object of my invention resides in the provision of an improved method and apparatus for providing a substantially uniform vacuum effect throughout all portions of the vacuum chamber at which the film centrifuging and film flowing operations are carried out.

Yet another object of my invention resides in the provision of improved details of means for preventing impurities from fouling the vacuum pump which produces the relatively highly rarified atmosphere within the vacuum chamber and through which pump the objectionable gases and moisture are passed.

These and other objects of my invention will be apparent from a perusal of the following specification when taken in connection with the following drawing wherein Fig. 1 is a schematic view of the entire apparatus;

Fig. 2 is a detail view showing the nozzle used for applying the liquid to the rotating discs arranged within the vacuum tank; and Fig. 3 is a detail illustrating the arrangement of vacuum pipes for collecting gases and moisture withdrawn from the liquid being treated.

Referring to the drawing, there is shown a cylindrical tank 2 made of glass and having a plurality of discs 3 rotatably mounted therein. The discs are arranged on a vertical shaft 4 mounted at its lower end in a roller bearing 5. This bearing is supported by a stirrup or frame 6 which, as shown is made out of hollow pipe. The hollow pipe forming the frame is supported by the cover 7 of the tank. The upper end of the shaft 4 is mounted in a bearing 8 and the shaft is rotated through a pulley 9 from any desired source.

The sides of the vacuum tank 2 preferably are formed of glass. The use of a transparent material for enclosing the purifying apparatus and maintaining it under reduced pressure enables the operator to see how the purification is proceeding and if advisable to make necessary adjustments in the temperature, degree of vacuum or other conditions.

One of the improved features of my present invention resides in the provision of perforate, reticulated, screen-like rotating or centrifuging surfaces onto which the liquid to be purified is fed, whereby as the liquid is thrown outwardly in thin films, both sides of the film are subjected to the rarified atmosphere whereby more effectively to cause a separation of the moisture and objectionable gases from the liquid and thereby preventing the formation of froth or foam.

The liquid is applied to the screen disc near its center while the disc is rotated at a high speed. I prefer to arrange the axis of the disc in a vertical position, but if desired the axis may be inclined at any degree to the vertical, or it may be arranged in a horizontal position. The liquid applied to the disc forms a film thereon, the thickness of the film decreasing as the distance from the center of the disc increases. The thickness of the film so formed is substantially less than one millimeter. Any single particle of the liquid in the film is caused to travel to the edge of the disc in a spiral path due to the rotational velocity imparted to the particle and because of the wetting of the disc surface by the particle surface of the liquid. There is induced into each particle of the film a rotational, spinning or whirling action on the axis of each particle.

As each particle of the film leaves the disc center and approaches the edge of the disc the individual particles of film decrease in size due to the various forces acting on both sides thereof, which forces include surface tension of the liquid, centrifugal force, contour of the disc, and the composition of the material from which the disc is made. The liquid thus centrifuged is projected from the rotating discs at high velocity in dispersed form. Means is provided within the vacuum chamber against which the dispersed particles of film may impinge or contact, whereby the particles of film will coalesce.

The liquid so formed is directed by the baffle or collecting means to another centrifuging element by which the centrifuging or dispersing action is repeated and there is provided, in turn, additional impact baffles and collecting means for feeding the coalesced liquid to still another centrifuging element, there being sufficient centrifuging elements and baffles within the vacuum chamber whereby to provide a sufficient path of travel including both film centrifuging operations, impact and film coalescing operation and film flowing operation within the relatively highly rarified atmosphere and for a sufficient length of time so as to remove substantially all of the moisture and objectionable gases from the liquid and whereby the liquid is delivered from the vacuum chamber in a purified state.

In my present invention I have shown improved details of construction of the baffles or collector pans which are associated with the centrifuging elements. As shown clearly in the drawing, a series of baffles 10 are arranged within the vacuum tank to collect the dispersed film particles thrown off from the rotating discs or centrifuging elements and for directing the coalesced liquid into the next lowest centrifuging disc. These baffles or collector pans comprise a substantially vertical, imperforate portion 11 preferably made of solid metal or other hard material to provide impact surfaces and having their upper ends turned inwardly to form flanges 12. The lower or conical portions 13 of the collector pans are preferably arranged at an angle of about 25 degrees to the horizontal and in order to cause the thin film of liquid flowing over these inclined collector pans to have both sides thereof exposed to the rarified atmosphere, in my present invention I form these inclined portions of perforate or reticulated material such as wire mesh screens having about two hundred meshes to the square inch. These inclined portions of the collector pans are provided with openings 14 at their centers, the arrangement being such that the liquid flowing therethrough is delivered onto the next lower rotating disc 3. By means of such construction, when the dispersed film particles thrown at high velocity against the perforate baffles 11 contact or impinge with such hard surfaces, the film particles are coalesced and the moisture and other objectionable gases being subjected to the shock impact are liberated and the liquid formed by the coalesced film particles is directed downwardly by the inclined baffle 13 flowing downwardly thereacross in such a manner that both sides of the thin film of liquid are subjected to the rarified atmosphere. This liquid flows onto the substantially central portion of the next lower centrifuging disc and is immediately thrown outwardly in the manner hereinbefore described. The liquid in passing through the series of centrifuging discs and collector basins, is practically constantly in a filmed form, both sides of which film are constantly being subjected to the action of the relatively highly rarified atmosphere within the vacuum chamber.

While I have described the inclination of the sloping portion 13 of the collector pans as being of substantially 25 degrees to the horizontal, it will be understood that this angle depends on other factors—upon the viscosity of the non-aqueous liquid being treated, the temperature and vacuum employed in the apparatus, and the amount of perforation of the centrifuging discs 3, in the present instance the mesh of the wire screen 3. It has been found that an inclination of about 25 degrees to the horizontal is very satisfactory when the liquid is heated to substantially 100 degrees Fahrenheit and when a vacuum of less than two pounds per square inch is employed within the vacuum chamber. The inclination of the baffles should be such that the liquid being purified is maintained in film form on the baffles for the optimum time to produce the greatest purification. The tank or vacuum chamber in which the rotating discs or centrifuging elements are arranged is maintained at subatmospheric pressure throughout the entire process and it is preferred to maintain a pressure of not over substantially two pounds per square inch absolute pressure. By employing such a vacuum, moisture and gas contained in the dispersed particles are eliminated immediately upon dispersion so that when the particles contact with each other they do not form a foam or froth. To this end a vacuum is maintained within the tank 2 by means of a vacuum pump 15 suitably connected to the pump or vacuum chamber 2. The vacuum pump is connected to the chamber 2 by pipe 16, heat exchanger 17, pipe 18, trap 19 and pipe 20. The pipe 20 is connected, as indicated at 21, to a main vacuum conduit 22 arranged within the vacuum chamber.

One of the improved features of my present invention resides in providing means for producing a substantially uniform vacuum effect throughout all portions of the vacuum chamber. To this end the main conduit 22 communicates with branch conduits 23 arranged adjacent the top edges of the collector pans. As shown in detail in Fig. 3 of the drawing, these branch conduits 23 are preferably provided with openings 24 which increase in size as the distance away from the main conduit 22 increases.

After the liquid which has been dispersed and subjected to the vacuum treatment leaves the vacuum tank or chamber, it is treated with an evacuated, anhydrous, gas-free adsorbent material in order to free it from materials such as unsaturates, resinous compounds, acidic compounds and oxidation products. For this purpose a container 25 from which the adsorbent material is supplied is arranged adjacent the vacuum tank. A screw conveyor 26 is arranged near the lower end of the container 25 and this conveyor is driven by a motor 27 through a driving chain 28. The evacuated adsorbent material is forced by the screw conveyor 26 through a conduit 29 and is mixed with the liquid flowing out of the vacuum tank through the pipe 30. The evacuated adsorbent material in the container 25 is maintained free from moisture and gas and in an evacuated condition by means of a pipe 31 connected to the tank 25 and extending into the vacuum tank 2.

The liquid flowing out of the vacuum tank 2 through pipe 30 is pumped by a pump 38 which may be provided with a by-pass 39 and pressure gauge 40, into an agitating tank 41 through a pipe 42. The agitating tank has a shaft 43 provided with paddles 44. The shaft is mounted in the agitating tank in such manner as to exclude air and moisture therefrom, and is driven through a pulley 45 from any desired source of power.

A plurality of filters 46 are connected to the agitating tank 41 by a pipe 47 and branch pipes 48. By this arrangement, one of the filters can be used while the other is being cleaned. After leaving the filters, the liquid passes through pipe 49 to a heat exchanger 50 from which it is delivered through a pipe 51 to storage tanks.

In carrying out the process, the liquid to be purified is introduced into a pipe 53, flows through heat exchangers 17 and 50, heater 54 and is introduced into the vacuum tank through pipes 55 and 56 and nozzle 57. In order to cause the liquid in pipe 55 to be delivered to the nozzle 57, plugs 58 are arranged as indicated in the pipe 6.

The liquid flows from the nozzle 57 onto the center of the top disc 3 and due to the rapid rotation of the disc is projected outwardly therefrom and contacts with the collector pans 10. The flanges 11 at the top edges of the pans prevent any of the dispersed particles from contacting with the sides of the vacuum tank. All of the particles are caused to flow down the sloping bottoms 13 of the collector pans and be delivered through the openings 14 to the next lowest rotating disc 3. During projection of the dispersed liquid outwardly from the discs 3, the particles are subjected to the action of the reduced pressure which causes the removal of moisture and gases from the particles. The prevention of foam and froth is accomplished by removing the moisture and gases from the particles as they are projected from the rotating discs and before they again coalesce to form a liquid. From the lowest disc on the shaft 4, the liquid is projected against the sides of the vacuum tank and flows to the bottom of the tank as indicated by the arrows.

The liquid from which the moisture and gases have been removed flows through pipe 30, pump 38, pipe 42, into the agitating chamber 41 where the liquid, and evacuated adsorbent material admitted to the liquid through pipe 29, are agitated. The liquid containing the evacuated adsorbent material flows into the filters 46 through the pipe 47. From the filters 46 the filtered liquid flows through pipe 49 and heat exchanger 50, from which it is delivered to suitable storage tanks (not shown) through the pipe 51.

In some cases, it may be desirable to introduce a small quantity of an inert gas, such as carbon dioxide, nitrogen, or other similar gas, into the stream of liquid to be purified before it is introduced into the vacuum chamber. Such inert gases may assist materially in effecting a more thorough drying of the liquid. Instead of using inert gases, I may employ more or less highly volatile dielectrics which accomplish similar results. The diffusion of an inert gas or a dielectric in the liquid has a cleaning-up or sweeping-out effect upon the water vapor and the volatile gases released in the vacuum chamber. In order to introduce the inert gas or dielectric material into the fluid stream, the same may be supplied from a container 32 and may be introduced into the stream of liquid to be provided through pipes 33 and 34 under the control of the valves 35. The inert gas or dielectric material may also be supplied to the liquid after leaving the vacuum tank and after having been agitated and filtered by delivering the gas from the tank 32 through the pipes 33, 34, and 36. This additional supply of gas to the filtered liquid prevents access of air or moisture to the purified product.

The moisture and gases abstracted from the dispersed particles and films on the rotating discs 3 and the sloping bottoms of the collector pans 10 are withdrawn from the tank through the openings 24 formed in the branch conduits 23. From the branch conduits the gases and moisture flow onto the main exhaust conduit 22, and from there into the pipe 20 and to the trap 19. The trap contains adsorbent material such as charcoal, calcium chloride, or phosphorous pentoxide which adsorb moisture and the lighter hydrocarbons. From the vacuum trap 19 the exhausted gases flow through the preheater 17, pipe 16 to the vacuum pump 15 and are delivered through the pipe 59. The provision of the trap for the exhaust gases and moisture aids in preventing the vacuum pump and vacuum connections from fouling.

My process is carried out without the liquid coming in contact with either moisture or atmospheric gases. The complete process is carried out in the manner above described but it will be understood that if desired the process may be conducted by passing the liquid to be purified through the vacuum chamber in the manner described in order to remove moisture and gases, and that the liquid, after being delivered from the vacuum tank, may be used without resorting to the addition of evacuated adsorbent material.

If it is not desired to heat the liquid before dispersing it in the vacuum tank, it may be introduced into the tank through pipe 60 without passing through the heater 54.

While in my present invention I have disclosed and prefer to employ perforated or reticulated rotating discs or screens to centrifuge and disperse the liquid and also employ collector pans having perforated or screen-like bottoms for directing and flowing the liquid onto the next lower disc from which the liquid is again dispersed in particles whereby to subject both sides of the film simultaneously to the action of the rarified atmosphere, it will be understood that it is within the contemplation of my invention to utilize perforated discs in conjunction with imperforate collecting pans and/or utilize imperforate discs in conjunction with collector pans having perforated bottoms. I prefer, however, to have both the rotating discs and the bottoms of the collecting pans perforate whereby to provide a process and apparatus giving the greatest efficiency of purification. I have found that if both the rotating discs and the bottoms of the collector pans are made of perforate material, such, for instance, where they are made of wire mesh screen, and particularly having about two hundred mesh per square inch, and if means is provided for maintaining a substantially uniform vacuum effect throughout all portions of the vacuum chamber, and particularly at the collector pans, I can increase the efficiency of the process by substantially 100 per cent over that obtained by practicing the invention in accordance with the joint application, Serial No. 299,530, hereinbefore cited.

I have described in detail the present preferred apparatus, and the present preferred manner of practicing the invention. It will be understood, however, that changes may be made in the apparatus and in the manner of practicing the process without departing from the spirit of the invention or the scope of the following claims.

Having thus fully described my invention, what I claim as new and desire to obtain by Letters Patent of the United States is:

1. In an apparatus for purifying liquids, a tank, means for maintaining a reduced pressure therein, a plurality of perforated discs rotatably mounted in the tank, the perforations of the discs being sufficiently small so that the discs sustain films of liquid, means for rotating the discs, means for applying liquid to one of the discs, and collector pans arranged within the tank and adapted to direct liquid projected from one disc onto another disc, a portion of said collector pans being perforated, the perforations of the pans being sufficiently small so that the pans sustain films of liquid.

2. In an apparatus for purifying liquids, a tank, means for maintaining a reduced pressure therein, a plurality of perforated discs rotatably mounted in the tank, the perforations of the discs being sufficiently small so that the discs sustain films of liquid, means for rotating the discs, means for applying liquid to one of the discs, and collector pans adapted to collect and deliver liquid projected from one disc onto another disc, the bottoms of the collector pans sloping downwardly and inwardly toward the centers of the discs and being perforated, the perforations of the pans being sufficiently small so that the pans sustain films of liquid.

3. In an apparatus for purifying liquids, a tank, means for maintaining reduced pressure therein, a plurality of discs rotatably mounted in said tank, means for rotating the discs, and collector pans in the tank for collecting liquid projected from one disc and delivering it onto another disc, portions of said collector pans being perforated, the perforations of the pans being sufficiently small so that the pans sustain films of liquid.

4. In an apparatus for purifying liquids, a tank, means for maintaining reduced pressure therein, a plurality of discs rotatably mounted in said tank, means for rotating the discs, and collector pans in the tank for collecting liquid projected from one disc and delivering it onto another disc, the sides of the pans being imperforate, the bottoms of the pans being perforate, the perforations of the pans being sufficiently small so that the pans sustain films of liquid.

5. In an apparatus for purifying liquids, a tank, means for maintaining reduced pressure therein, a plurality of discs rotatably mounted in said tank, means for rotating the discs, and collector pans in the tank for collecting liquid projected from one disc and delivering it onto another disc, the sides of the pans being imperforate, the bottoms of the pans being perforate and sloping downwardly and inwardly toward the centers of the discs at an angle of about 25 degrees to the horizontal, the perforations of the pans being sufficiently small so that the pans sustain films of liquid.

6. In an apparatus for purifying liquids, a tank, means for maintaining reduced pressure therein, a plurality of discs rotatably mounted in said tank, means for rotating the discs, and collector pans in the tank for collecting liquid projected from one disc and delivering it onto another disc, the means for maintaining reduced pressure in the tank including pipes arranged adjacent the upper edges of the collector pans and having openings therein.

7. The process of removing moisture and gases from liquids, which comprises projecting the liquid centrifugally in a rarified atmosphere to divide it into particles, collecting the particles, and flowing them in film form with both surfaces of the film exposed to the rarified atmosphere.

8. The process of removing moisture and gases from liquids, which comprises distributing the liquid centrifugally in a thin film while exposing both surfaces of the film to a rarified atmosphere, dividing the liquid into particles, collecting the particles, and flowing the collected particles in film form with both surfaces of the film exposed to the rarified atmosphere.

9. The process of removing moisture and gases from liquids comprising projecting the liquid in a relatively thin film centrifugally in a relatively highly rarified atmosphere while exposing both surfaces of the film to such atmosphere during the film-projecting operation.

10. In an apparatus for drying and degasifying liquids, a tank, a plurality of foraminous discs rotatably mounted in said tank, means for rotating the discs to cause fluid deposited thereon to flow on the discs in thin films, and means in the tank for collecting liquid projected from one disc and delivering it onto another disc, and means associated with said discs and liquid collecting means for maintaining a substantially uniform vacuum effect at the discs and collecting means.

11. An apparatus for drying and degasifying liquids, a tank, and a series of spaced-apart rotating foraminous discs and intervening collector pans for collecting liquid projected from one disc and delivering it onto another disc, and means associated with said discs and collector pans for maintaining a substantially uniform vacuum effect throughout the series.

12. The herein described process of drying and degasifying a liquid which comprises forming the liquid to be purified as a film in a relatively high vacuum in a manner so as to cause both sides of the film to be exposed to the vacuum by subjecting the liquid to centrifugal action, impacting the film to release volatile impurities and to coalesce the film into liquid form, and causing the liquid to flow in relatively thin film-like form while having both sides of the film exposed to the action of the vacuum.

13. An apparatus of the character described comprising means providing a chamber, means for maintaining a relatively high vacuum therein, means for projecting liquid to be purified in finely divided form against an impact surface to release volatile impurities, means for collecting the impacted liquid, and a plurality of perforated surfaces over which the liquid is adapted to flow in film-like form and whereby said flowing film of liquid will be subjected on both sides thereof to the action of the vacuum.

14. An apparatus of the character described comprising means providing a chamber, means for maintaining a relatively high vacuum therein, means for projecting liquid to be purified in finely divided form against an impact surface to release volatile impurities, means for collecting the impacted liquid, and a plurality of perforated surfaces over which the liquid is adapted to flow in film-like form and whereby said flowing film of liquid will be subjected on both sides thereof to the action of the vacuum, and means to introduce an inert gas into the liquid before it is projected into the vacuum chamber in order to assist in the removal of the volatile impurities.

15. An apparatus for drying and degasifying liquids, a tank, and a series of spaced-apart rotating foraminous discs and intervening collector pans for collecting liquid projected from one disc and delivering it onto another disc, and means associated with said discs and collector pans for maintaining a substantially uniform vacuum effect throughout the series, means for introducing liquid to be purified in said tank and for removing the purified liquid from the tank, and means for adding a moisture and gas expelling medium to the liquid either before it is introduced into the tank or after it has been removed therefrom.

16. An apparatus for removing moisture and gases from liquids, comprising means forming a chamber, means to maintain a relatively high vacuum in said chamber, and rotating means including a foraminous plate in said chamber for projecting the liquid therein along the plane of the plate as a relatively thin film while exposing both sides of the film to the action of the vacuum in order to liberate and remove the moisture and gases from the liquid.

17. An apparatus for removing moisture from gases and liquids, comprising means forming a chamber, means for maintaining a relatively high vacuum in said chamber, a rotating foraminous plate in said chamber, means for delivering liquid onto said plate whereby the liquid so delivered may be expelled radially along the plate as a relatively thin film exposed on both sides to the action of the vacuum whereby to liberate and remove the moisture and gases from the liquid comprising said radially moving film.

18. The herein described process of drying and degasifying a liquid, which comprises forming the liquid to be purified as a film by subjecting the liquid to centrifugal action while exposing both sides of the film to a drying and degasifying atmosphere under subnormal pressure.

CLARENCE J. RODMAN.